(12) United States Patent
Baldwin et al.

(10) Patent No.: US 6,215,775 B1
(45) Date of Patent: Apr. 10, 2001

(54) NODE INSERTION AND REMOVAL IN A LOOP NETWORK

(75) Inventors: David Baldwin, Irvine; Karl M. Henson, Margarita; David Brewer, Anaheim, all of CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 09/177,550

(22) Filed: Oct. 22, 1998

(51) Int. Cl.$^7$ .................................................. H04L 12/28
(52) U.S. Cl. ............................................ 370/258; 370/254
(58) Field of Search ................................ 370/400, 403, 370/404, 405, 258, 452, 453, 454, 460, 462; 709/251, 236

(56) References Cited

U.S. PATENT DOCUMENTS

| | | | |
|---|---|---|---|
| 5,495,580 | | 2/1996 | Osman . |
| 5,522,047 | | 5/1996 | Grow et al. . |
| 5,598,541 | * | 1/1997 | Malladi ................................ 709/251 |
| 5,638,512 | | 6/1997 | Osman et al. . |
| 5,638,518 | * | 6/1997 | Malladi ................................ 709/251 |
| 5,659,718 | | 8/1997 | Osman et al. . |
| 5,751,715 | * | 5/1998 | Chan ................................... 370/455 |
| 5,978,379 | * | 11/1999 | Chan ................................... 370/403 |
| 6,064,679 | * | 5/2000 | Hashemi .............................. 370/513 |
| 6,101,166 | * | 8/2000 | Baldwin .............................. 370/222 |

OTHER PUBLICATIONS

Fiber Channel Tutorial, http://www.fibrechannel.com/technology/tutorial.htm.
Fibre Channel Overview, http://www.cern.ch/HSI/fcs/spec/overview.htm.
Fibre Channel Glossary, http://www.iol.unh.edu/training/fc/fcglossary.html.

* cited by examiner

*Primary Examiner*—Douglas Olms
*Assistant Examiner*—Ricardo M. Pizarro
(74) *Attorney, Agent, or Firm*—Fish & Richardson P.C.

(57) ABSTRACT

Methods and apparatus for implementing a technique for inserting and removing a node in a network loop. In a preferred implementation, a hub port includes a detect element which monitors data from the node and from an upstream node. The detect element sets a first flag when a primitive is received at the port, and sets a second flag when a primitive which is a frame termination primitive is received at the port. A frame termination generator generates frame termination primitives and a buffer data generator generates buffer data. A switching element has a control input, an output, and a plurality of data inputs. One data input is connected to each of an output of the node, the upstream node, the frame termination generator, and the buffer data generator. A control element is connected to the detect element and the control input of the switching element. The control element selects, according to the first flag and the second flag, one of the data inputs of the switching element to connect to the output of the switching element to be output by the port to a downstream node.

9 Claims, 3 Drawing Sheets

NODE INSERTION AND REMOVAL IN A LOOP NETWORK

TECHNICAL FIELD

The present invention relates to electronic network communications systems, and more specifically to insertion and removal of a node in a loop network.

BACKGROUND INFORMATION

Electronic data systems are frequently interconnected using network communication systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, full motion, high-quality video. ANSI specifications, such as X3.230-1994, define the Fibre Channel network. This specification distributes Fibre Channel functions among five layers. The five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports, forming a star topology with the hub at the center. Hub ports which are not connected to node ports or which are connected to failed node ports are bypassed. In this way, the loop is maintained despite removal or failure of node ports.

More particularly, an FC-AL network is typically composed of two or more node ports linked together in a loop configuration forming a single data path. Such a configuration of a node port-to-node port loop is shown in FIG. 1. In FIG. 1, six node ports 102, 104, 106, 108, 110, 112 are linked together by data channels 114, 116, 118, 120, 122, 124. In this way, a loop is created with a datapath from node port 102 to node port 104 through data channel 114 then from node port 104 to node port 106 through data channel 116, and so on to node port 102 through data channel 124.

When there is a failure at any point in the loop, the loop datapath is broken and all communication on the loop halts. For example, if node port 104 fails, data no longer passes through node port 104. A failure may also occur in a data channel between node ports, such as by a physical break in the wire or electromagnetic interference causing significant data corruption or loss at that point. At this point, loop 100 has been broken. Data no longer flows in a circular path and the node ports are no longer connected to one another. The loop has, in effect, become a unidirectional linked list of node ports.

A conventional technique to avoid broken datapaths in a node port-to-node port loop introduces a hub within a loop. A hub creates a physical configuration of node ports in a star pattern, but the virtual operation of the node ports continues in a loop pattern. The connection process (i.e., sending data between node ports) and interaction with the hubs is effectively transparent to the node ports connected to the hub, which perceive the relationship as a standard Fibre Channel arbitrated loop configuration.

FIG. 2 illustrates an arbitrated loop 200 with a centrally connected hub. Similar to loop 100 illustrated in FIG. 1, loop 200 includes six node ports 202, 204, 206, 208, 210, 212, each attached to a hub 214. Hub 214 includes six hub ports 216, 218, 220, 222, 224, 226 where each hub port is connected to another hub port in a loop topology by a sequence of internal hub links. In this way, node ports 202–212 are each connected to a corresponding hub port 216–226. Thus, node ports 202–212 operate as though connected in a loop fashion as illustrated in FIG. 1. Data typically flows into a hub port from an upstream hub port, into the attached node port, back from the node port to the hub port, and out of the hub port to a downstream hub port.

When a node port or a data channel fails or is disconnected, the loop is maintained by bypassing the failed node port. In a conventional hub, when a hub port no longer receives data from a node port, the hub port goes into a bypass mode. In bypass mode, rather than passing data received on the data channel from the node port, the hub port passes data received along the internal hub link from the previous, upstream hub port. Thus, nodes are removed and inserted in the loop by changing the corresponding hub port in and out of bypass mode.

The content of a datastream of an FC-AL network is defined by FC-AL protocols. Characters are constantly moving through the loop from one port to the next. These characters may be actual data or loop control signals. Loop control signals are always present in the datastream except when a data frame is being sent from a source node port to a destination node port. Under FC-AL protocols, the loop control signals are ordered sets, including primitive signals and primitive sequences. Ordered sets typically begin with a special character indicating the beginning of an ordered set, such as K28.5. A data frame is an uninterrupted stream of data preceded by a special ordered set called a Start Of Frame ("SOF") and succeeded by a special ordered set called an End Of Frame ("EOF").

A datastream of encoded characters ideally always has a valid "running disparity". The encoded characters are defined according to a conventional 8B/10B encoding scheme, defined in Fibre Channel protocols. The running disparity at the end of a character in the datastream is the difference between the number of 1's and 0's in the bit encoding of the character. A character with more 1's than 0's has a positive running disparity. A character with more 0's than 1's has a negative running disparity. A character with an equal number of 1's and 0's has a neutral running disparity. An encoder transmits a positive, negative, or neutral disparity encoded character. A neutral character does not affect the running disparity of the datastream. A positive character changes the running disparity from negative to positive and a negative character changes the running disparity from positive to negative.

Each word has an overall running disparity as well. The running disparity for a word determines the effect that word has on the running disparity of the datastream. As with characters, a word with a positive running disparity changes the running disparity to positive at the end of the word. Similarly, a word with a negative disparity changes the running disparity to negative and a word with a neutral disparity leaves the running disparity the same as the running disparity before the word.

The running disparity between words is defined to be negative between data frames. The last word of a frame, an EOF, ensures the running disparity is negative. Each ordered set in the gap between frames has an overall running disparity of neutral so that the running disparity at the end of each word remains negative.

If the encoder sends a negative disparity encoded character when the running disparity is negative, or a positive encoded character when the running disparity is positive, a running disparity error results. This error typically introduces an invalid character into the loop.

Ideally, all the data in the loop are valid data characters, all the control signals are valid ordered sets, there are no running disparity errors, data is properly formatted into data frames, and only ordered sets are present between data frames. However, errors are sometimes introduced into loops for a variety of reasons, such as when devices are inserted into the loop, bad cables are used, or when a device does not comply with FC-AL protocols.

The inventors have determined that it would be desirable to provide apparatus and methods for inserting and removing nodes from a loop network without introducing errors into the loop.

SUMMARY

The invention provides methods and apparatus for implementing a technique for inserting and removing a node in a network loop. In a preferred implementation, a hub port includes a detect element which monitors data from the node and from an upstream node. The detect element sets a first flag when a primitive is received at the port, and sets a second flag when a primitive which is a frame termination primitive is received at the port. A frame termination generator generates frame termination primitives and a buffer data generator generates buffer data. A switching element has a control input, an output, and a plurality of data inputs. One data input is connected to each of an output of the node, the upstream node, the frame termination generator, and the buffer data generator. A control element is connected to the detect element and the control input of the switching element. The control element selects, according to the first flag and the second flag, one of the data inputs of the switching element to connect to the output of the switching element to be output by the port to a downstream node.

In an FC-AL implementation, a hub port includes an ordered set detection circuit and an end of frame detection circuit. The ordered set detection circuit monitors data from a node to be changed and from an upstream node, and sets an ordered set flag when an ordered set is received at the hub port. Similarly, the end of frame detection circuit monitors data from the node and from an upstream node, and sets an end of frame flag when an end of frame ordered set is received at the hub port. An end of frame generator generates end of frame ordered sets and a current fill word generator generates current fill word ordered sets. A multiplexor has a multiplexor control input, a multiplexor output, and a plurality of multiplexor inputs. The multiplexor output is connected to a hub port output which is in turn connected to a downstream hub port. One multiplexor input is connected to each of a node port input connected to the node, a hub port input connected to an upstream hub port, the end of frame generator, and the current fill word generator. An output control circuit is connected to the ordered set detection circuit, the end of frame detection circuit, and the multiplexor control input. The output control circuit controls which multiplexor input is connected to the multiplexor output according to signals from the detection circuits.

DETAILED DESCRIPTION

The invention provides apparatus and methods for inserting and removing nodes in a loop network. A node is inserted or removed during an interframe gap so that invalid frames and invalid data caused by disrupting a frame do not arise and propagate throughout the loop. The invention is explained below in the context of a Fibre Channel Arbitrated Loop ("FC-AL") network as an illustration of a preferred implementation. However, the invention may have applicability to networks with similar characteristics to FC-AL networks.

Figure 1:
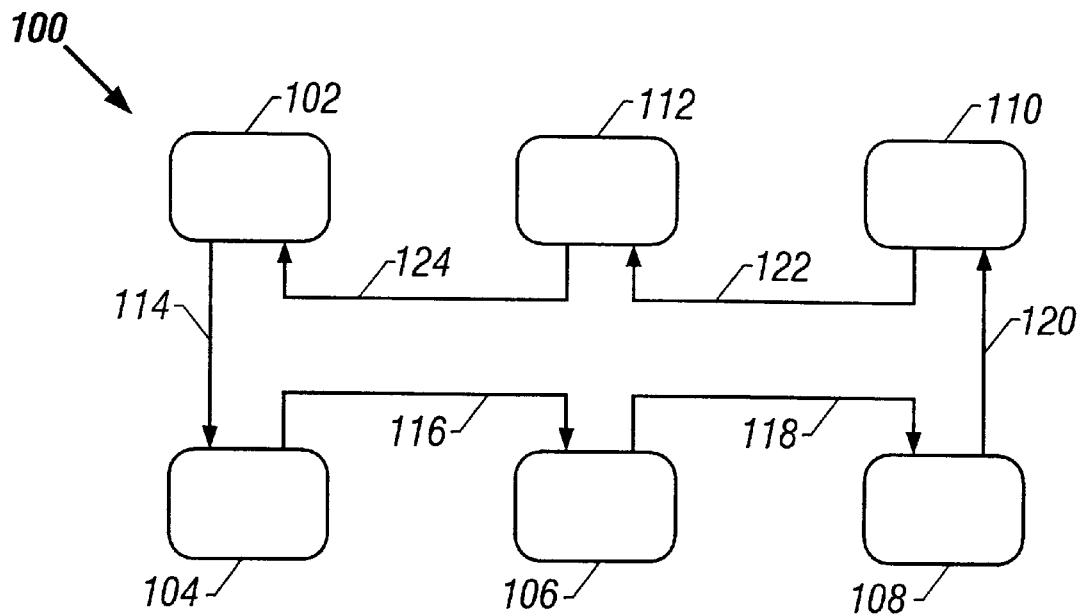
FIG. 1 shows a prior art loop of directly interconnected node ports.
Figure 2:
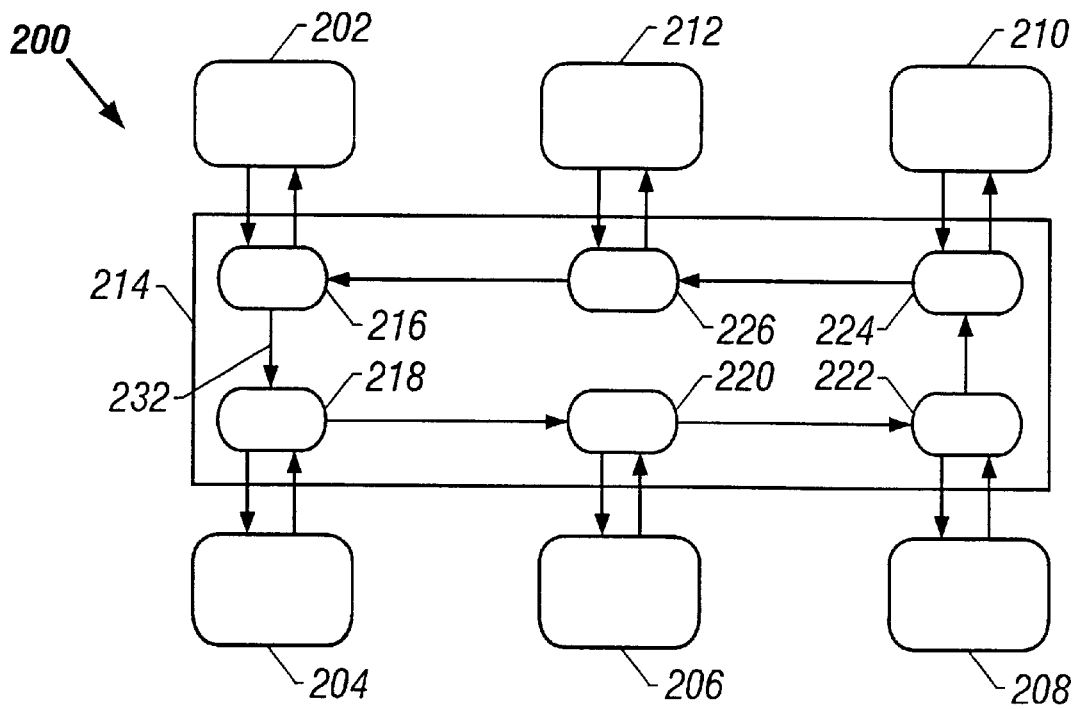
FIG. 2 shows a prior art loop including a hub.

In a preferred implementation, each hub port of a hub in a loop network connects an attached node port to the loop (recall FIG. 2). Not all hub ports are necessarily attached to node ports at all times. Each hub port includes components to detect network primitives and frame termination primitives. Using these detection components, the hub port is able to determine when an interframe gap is available to insert or remove the node. A frame includes a series of one or more data words preceded by a frame initiation primitive and followed by a frame termination primitive. An interframe gap occurs after a frame termination primitive and before the next frame initiation primitive. In an FC-AL implementation, as noted above, a frame initiation primitive is an SOF ordered set and a frame termination primitive is an EOF ordered set. Under FC-AL protocols, an interframe gap is defined to include six ordered sets, by default. By removing or inserting the node during an interframe gap, the insertion or removal does not disrupt frames in the datastream of the hub port and also does not disrupt the running disparity of the datastream.

If a node is inserted while the upstream node is sending a frame, data from the inserted node may interrupt the frame. Such an interruption creates an invalid partial frame and may cause errors in the loop. For example, referring to the loop shown in FIG. 2, in an FC-AL implementation, assume node 212 is sending a frame including an SOF ordered set, ten data words, and an EOF ordered set. If node 202 is inserted after the SOF has passed through hub port 216 and before the EOF, such as between the third and fourth data words, the frame from node 212 is split. A partial frame (including an SOF followed by three data words) reaches hub port 218 and node 204. An additional partial frame (including seven data words and an EOF) later reaches node 204. These partial frames are separated by whatever data node 202 inserts into the datastream before passing data from upstream nodes.

If a node is removed while sending a frame, a partial frame is sent onto the loop, which may cause errors in the loop. For example, assume node 202 is sending a frame including an SOF, ten data words, and an EOF. If node 202 is removed after the SOF has left hub port 216 and before the EOF, a partial frame is introduced to the loop, as described above.

If a node is removed while an upstream node is sending a frame, part of the frame may be lost, again creating an invalid frame. For example, assume node 212 is sending a frame including an SOF, ten data words, and an EOF. The frame enters hub port 216 and passes to node 202. If node 202 is removed after the SOF and before the EOF have passed through the hub port to node 202, such as between the third and fourth data words, the frame from node 212 is split. A partial frame (including seven data words and an EOF) passes through hub port 216 to hub port 218 and reaches node 204.

In addition, as noted above, inserting or removing a node during frames can disrupt the running disparity of the datastream. Because there is no coordination between the datastream on the broken side of a partial frame and the partial frame, the running disparity can be disrupted by the transition. For example, assume a partial frame includes an SOF ordered set, and three data words. The partial frame is immediately followed by a series of ordered sets. The transition from the third data word in the partial frame to the first ordered set may create a running disparity error, such as when the third data word has an ending positive running disparity and the first ordered set has a neutral running disparity. As described above, the running disparity between words during interframe gaps is defined to be negative. The neutral running disparity of the first ordered set leaves the running disparity at positive, in violation of the protocol.

By inserting or removing a node during an interframe gap, partial frames from the upstream node are not created. The hub port also terminates a frame from the node to be removed to avoid introducing a partial frame into the loop. In an FC-AL implementation, inserting and removing during interframe gaps does not disrupt the running disparity because the running disparity between words during an interframe gap is defined to be negative. The hub port can use this definition to avoid introducing running disparity errors, as described below.

Figure 3:
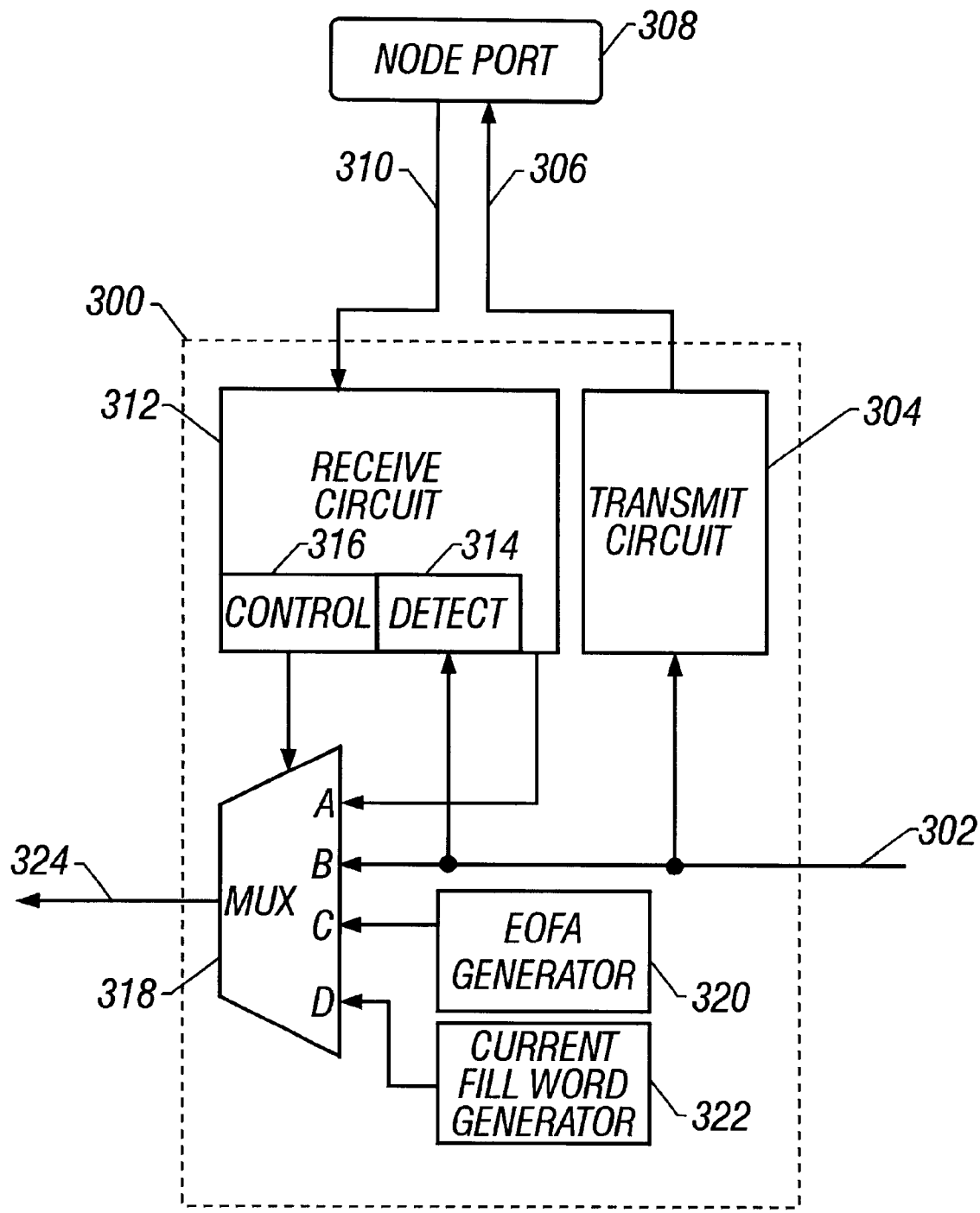
FIG. 3 shows a block diagram of a hub port of a preferred implementation.

As shown in FIG. 3, a hub port 300 according to a preferred implementation includes an incoming internal hub link 302 connected to a transmit circuit 304. Incoming internal hub link 302 carries data from an upstream hub port (not shown) to hub port 300 and into transmit circuit 304. Transmit circuit 304 transmits the data to node port 308 on a data channel 306 in a form usable to node port 308. Node port 308 is a connection to a node or loop segment (not shown). In an FC-AL implementation, transmit circuit 304 preferably encodes (preferably using 8B/10B encoding) and serializes the data before transmitting the data to node port 308. Transmit circuit 304 encodes the data to maintain correct running disparity.

Node port 308 transmits data from the node back to hub port 300 on a data channel 310. Data channel 310 is connected to a receive circuit 312. In an FC-AL implementation, receive circuit 312 preferably deserializes and decodes the data from node port 308, preferably using 10B/8B decoding. Receive circuit 312 includes a detect circuit 314 and an output control circuit 316. Detect circuit 314 is also connected to incoming internal hub link 302. Detect circuit 314 monitors the content of the datastream from node port 308 and from the upstream node port and sends flags to output control circuit 316, described in more detail below. Preferably, the datastream output by receive circuit 312 includes a first bit flag indicating the current word is a primitive, such as an ordered set, and a second bit flag indicating the current word is a frame termination primitive, such as an EOF ordered set. To set these bit flags, detect circuit 314 examines each word in the datastream from node port 308 and recognizes primitives and each type of frame termination primitive. Detect circuit 314 causes receive circuit 312 to set or clear the appropriate bit flags in the datastream output by receive circuit 312. The datastream from the upstream node port also includes the bit flags indicating the current word is a primitive or a frame termination primitive. Detect circuit 314 uses these bit flags to detect primitives and frame termination primitives in the datastream from the upstream node.

In an alternative implementation, instead of responding to separate flags generated by detect circuit 314, control circuit 316 directly monitors the datastream to be output by receive circuit 312 and the datastream from the upstream node port. Detect circuit 314 monitors the datastream from node port 308 and sets the bit flags in the datastream to be output by receive circuit 312. Control circuit 316 checks the bit flags and controls the output of hub port 300 according to the state of the bit flags. Alternatively, detect circuit 314 and control circuit 316 are combined into a single component.

A switching device such as a multiplexor 318 controls the output of hub port 300 in response to control signals from output control circuit 316. Receive circuit 312 sends data from node port 308 to a first data input A of multiplexor 318. Incoming internal hub link 302 is connected to a second data input B of multiplexor 318. A frame termination generator 320 is connected to a third data input C of multiplexor 318. Frame termination generator 320 preferably generates frame termination primitives and the bit flags indicating the primitive is a primitive and a frame termination primitive. In an FC-AL implementation, frame termination generator 320 preferably generates EOFA ordered sets. An EOFA ordered set is a special type of EOF ordered set indicating an abort of the current frame. A buffer data generator 322 is connected to a fourth data input D of multiplexor 318. Buffer data generator 322 preferably generates buffer data and the bit flags indicating the buffer data is a primitive and not a frame termination primitive. In an FC-AL implementation, buffer data generator 322 preferably generates current fill words according to FC-AL protocols. An output of multiplexor 318 is connected to an outgoing internal hub link 324. Output control circuit 316 is connected to a control input of multiplexor 318 to select the data input of multiplexor 318 to connect to outgoing internal hub link 324. Outgoing internal hub link 324 sends data to a downstream hub port (not shown) in the loop.

In operation, when hub port 300 is in bypass mode, such as when a node is not connected to hub port 300 or the node has failed, output control circuit 316 causes data input B to be connected to outgoing internal hub link 324. When hub port 300 is not in bypass mode, output control circuit 316 causes data input A to be connected to outgoing internal hub link 324.

Figure 4:
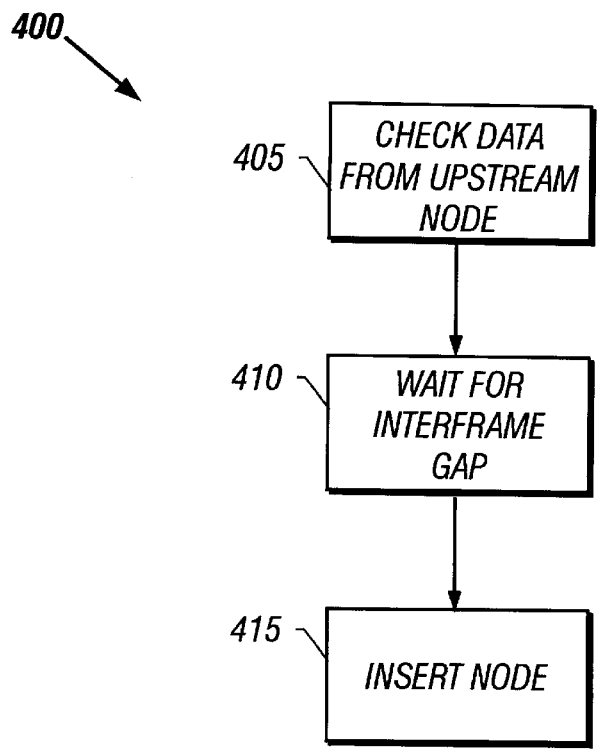
FIG. 4 is a flow chart of a process of inserting a node.

As shown in FIG. 4, in a process 400 of inserting a node into the loop and taking hub port 300 out of bypass mode, hub port 300 examines the datastream from the upstream node to find an interframe gap (step 405). Detect circuit 314 checks each word in the datastream. When detect circuit 314 detects a primitive which is not a frame termination primitive, detect circuit 314 sets an upstream interframe flag (step 410). The upstream interframe flag indicates to output control circuit 316 that the upstream node is sending primitives and the datastream from the upstream node is at an interframe gap. In response, output control circuit 316 causes multiplexor 318 to connect data input A to outgoing internal hub link 324 (step 415), such that the data from node port 308 is inserted into the datastream preferably before the word which caused the upstream interframe flag to be set. By definition, in a properly configured datastream, primitives only arise between frames. Thus, when detect circuit 314 detects a primitive from the upstream node which is not a frame termination primitive, detect circuit 314 recognizes that the current word should be between frames in the datastream from the upstream node.

Figure 5:
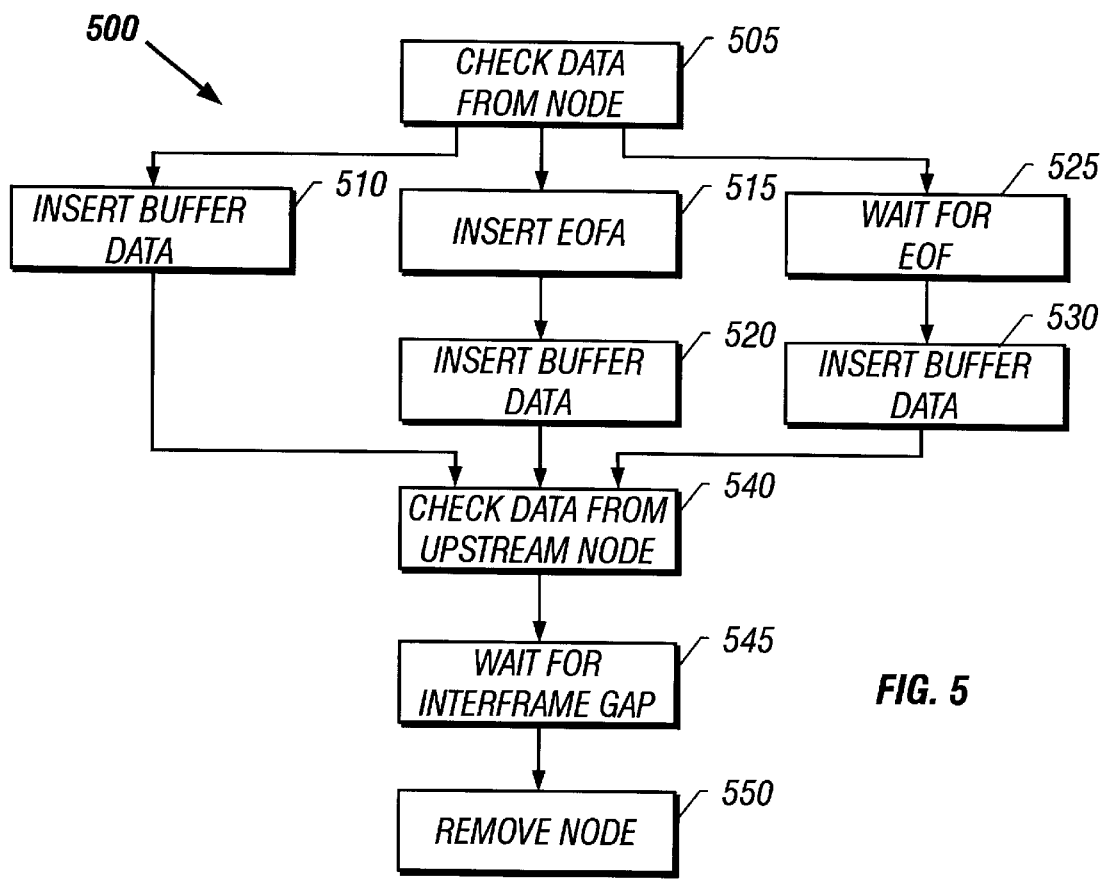
FIG. 5 is a flow chart of a process of removing a node.

As shown in FIG. 5, in a process 500 of removing a node from the loop and putting hub port 300 into bypass mode, hub port 300 examines the current word in the datastream from node port 308 (step 505) and monitors the datastream from the upstream node (step 540). When the current word from node port 308 is a primitive which is not a frame termination primitive, detect circuit 314 sets a node interframe flag. The node interframe flag indicates to output control circuit 316 that node port 308 is sending primitives and the datastream from node port 308 is at an interframe gap. In response, output control circuit 316 causes multiplexor 318 to connect buffer data generator 322 to outgoing internal hub link 324 (step 510). Output control circuit 316 maintains this connection until detect circuit 314 sets the upstream interframe flag, indicating the datastream from the upstream node is currently between frames, as described above (step 545).

When the current word from node port 308 is not a primitive, detect circuit 314 sets a node frame abort flag. The node frame abort flag indicates to output control circuit 316 that node port 308 is currently sending a frame which has not yet terminated and the frame should be aborted before changing to bypass mode. To properly terminate the frame, output control circuit 316 causes multiplexor 308 to connect frame termination generator 320 to outgoing hub internal link 324 for one word (step 515). After terminating the frame, output control circuit 316 causes multiplexor 318 to connect buffer data generator 322 to outgoing internal hub link 324 (step 520) until detect circuit 314 sets the upstream interframe flag (step 545).

When the current word from node port 308 is a frame termination primitive, detect circuit 314 sets a node frame termination flag. The node frame termination flag indicates to output control circuit 316 that node port 308 has completed the frame successfully. Accordingly, output control circuit 316 does not change the connection of multiplexor 308 for one word, allowing the frame termination primitive from node port 308 to pass onto outgoing internal hub link 324 (step 525). After allowing the frame to terminate, output control circuit 316 causes multiplexor 318 to connect buffer data generator 322 to outgoing internal hub link 324 (step 530) until detect circuit 314 sets the upstream interframe flag (step 545).

When detect circuit 314 sets the upstream interframe flag, hub port 308 changes to bypass mode. Output control circuit 316 causes multiplexor 318 to connect incoming internal hub link 302 to outgoing internal hub link 324 (step 550). As a result, the node or loop segment connected to node port 308 is removed from the loop during an interframe gap in the datastream from the upstream node.

In an alternative implementation, when the node frame abort flag is set, output control circuit 316 checks status information before terminating the frame. The status information indicates to output control circuit 316 the reason for removing node port 308. When node port 308 can still transmit valid data or is to be removed for administrative purposes, such as for scheduled maintenance or upgrades, output control circuit 316 does not change the connection of multiplexor 318 until the node interframe flag is set, as described above. By allowing node port 308 to complete the frame being sent, some data loss can be avoided. When node port 308 is to be removed because node port 308 has failed or is no longer transmitting valid data, output control circuit 316 terminates the frame immediately, as described above.

In another alternative implementation, the control for insertion and removal is located in the node itself, rather than in a hub port. Such a node sends control signals to a connected hub port to control the bypass mode of the hub port, similar to the techniques described above. Alternatively, such a node is connected directly to other nodes. In this case, the node connection circuits can enter or leave a bypass mode to insert and remove the node from the loop, again using the techniques described above.

In an alternative FC-AL implementation, the hub port directly ensures that running disparity is maintained at each transition, either insertion or removal. In the implementation described above, the running disparity is preserved through the definitions of FC-AL protocols and because the datastream on the internal hub links is decoded. The transmit circuit (e.g., 304 in FIG. 3) encodes the datastream with proper running disparity. In this alternative implementation, the output control circuit maintains valid running disparity by adjusting the running disparity of ordered sets introduced into the loop, such as by controlling the output of the buffer data generator.

A preferred implementation has been described along with several alternative implementations. However, variations which fall within the scope of the following claims are within the scope of the present invention. For example, the detect circuit and the output control circuit may be positioned outside the receive circuit of a hub port. Alternatively, the switching device (e.g., multiplexor 318 in FIG. 3) may be a cross-point switch. In another implementation, the technique can be implemented in programmable hardware or software. Accordingly, the present invention is not limited to the implementations described above but only by the scope of the following claims.

What is claimed is:

1. A port for connecting a node to a network loop, the port comprising:
  (a) a detect element, where the detect element monitors data from the node and from an upstream node, and sets a first flag when a primitive is received at the port, and sets a second flag when a primitive which is a frame termination primitive is received at the port;
  (b) a frame termination generator, which generates frame termination primitives;
  (c) a buffer data generator, which generates buffer data;
  (d) a switching element having a control input, an output, and a plurality of data inputs, where one data input is connected to each of an output of the node, the upstream node, the frame termination generator, and the buffer data generator; and (e) a control element connected to the detect element and the control input of the switching element, where the control element selects, according to the first flag and the second flag, one of the data inputs of the switching element to connect to the output of the switching element to be output by the port to a downstream node, where said control element is arranged to select the data input of the switching element corresponding to the frame termination generator such that the selection does not cause invalid running disparity in a data stream between ports.

2. The port of claim 1, where the port is a hub port in a Fibre Channel Arbitrated Loop.

3. The port of claim 1, where the frame termination primitives are FC-AL EOFA ordered sets.

4. The port of claim 1, where the buffer data are FC-AL current fill words.

5. The port of claim 1, where data between ports includes a first bit indicating the current word is a primitive and a second bit indicating the current word is a frame termination primitive.

6. The port of claim 1, where the control element causes the switching element to change from connecting the data input corresponding to data from the node to a different data input after the node has completed a frame of data.

7. The port of claim 1, where each node in the loop network includes a port.

8. A hub port for connecting a node to a Fibre Channel Arbitrated Loop, the hub port comprising:

(a) an ordered set detection circuit, where the ordered set detection circuit monitors data from the node and from an upstream node, and sets an ordered set flag when an ordered set is received at the hub port;

(b) an end of frame detection circuit, where the end of frame detection circuit monitors data from the node and from an upstream node, and sets an end of frame flag when an end of frame ordered set is received at the hub port;

(c) an end of frame generator, which generates end of frame ordered sets;

(d) a current fill word generator, which generates current fill word ordered sets;

(e) a hub port output;

(f) a hub port input;

(g) a node port input, connected to an output of the node;

(h) a multiplexer having a multiplexer control input, a multiplexer output, and a plurality of multiplexer inputs, where the multiplexer output is connected to the hub port output and one multiplexer input is connected to each of the node port input, the hub port input, the end of frame generator, and the current fill word generator; and (i) an output control circuit connected to the ordered set detection circuit, the end of frame detection circuit, and the multiplexer control input, where the output control circuit controls which multiplexer input is connected to the multiplexer output, where said output control circuit is arranged to select the multiplexer input corresponding to the end of frame generator such that the selection does not cause invalid running disparity in a data stream between ports.

9. A method of removing a node from a network loop, comprising:

(a) receiving node data from the node;

(b) when the node data is not a primitive, transmitting a frame termination primitive and buffer data to a downstream node;

(c) receiving upstream data from an upstream node;

(d) when the upstream data is not a primitive, transmitting buffer data to a downstream node;

(e) when the upstream data is a frame termination primitive, transmitting buffer data to a downstream node; and (f) when the upstream data is a primitive which is not a frame termination primitive, removing the node from the network loop.

* * * * *